United States Patent [19]

Hart

[11] 4,305,620
[45] Dec. 15, 1981

[54] PNEUMATIC SEPARATING SYSTEM FOR CONTINUOUS MINING MACHINE

[76] Inventor: Gwyn G. Hart, Rte. 87, Box 100, Shady Springs, W. Va. 25910

[21] Appl. No.: 123,768

[22] Filed: Feb. 20, 1980

[51] Int. Cl.³ .............................................. E21C 35/22
[52] U.S. Cl. .......................................... 299/7; 299/18; 299/19
[58] Field of Search ..................... 299/7, 8, 68, 18, 12, 299/9, 19; 209/24, 25, 134, 135; 175/66, 206

[56] References Cited

U.S. PATENT DOCUMENTS

| | | | |
|---|---|---|---|
| 1,728,046 | 9/1929 | Duerr | 209/134 X |
| 1,999,261 | 4/1935 | Shultz et al. | 175/206 X |
| 2,606,010 | 8/1952 | Howard | 299/18 X |
| 3,108,788 | 10/1963 | Allimann | 299/68 X |
| 3,743,356 | 7/1973 | Sheets | 299/18 |
| 3,857,490 | 12/1974 | Wilcox | 299/18 X |
| 4,107,034 | 8/1978 | Paterson et al. | 209/135 |

Primary Examiner—Ernest R. Purser
Attorney, Agent, or Firm—Lowe, King, Price & Becker

[57] ABSTRACT

A coal mining system is provided including a pneumatic separator having an air lock to separate the coal dust from the remainder of the coal aggregate in the system. A pneumatic suction means is provided to convey the dislodged coal aggregate from the mine face as it is mined by a mining machine. A duct carries the coal aggregate from the mining machine, past the separator where the coal aggregate remainder is transferred to an auger conveyor with the coal dust proceeding to a pollution control mechanism, such as a cyclone separator at a remote location outside the mine. A jet engine provides the suction for the system. A hopper is provided above the inlet to the auger conveyor providing the blocking concentration of coal to assure maintenance of the full vacuum in the pneumatic duct. A level control switch is operated by pivotal spade in the hopper and a similar switch is provided to sound an alarm when the hopper is filled to capacity. The auger conveyor discharges onto a second belt conveyor open to the ambient conditions to convey the coal aggregate remainder to its final location. The mining machine and the pneumatic separator are mounted on tracks for movement along the mine shaft.

9 Claims, 2 Drawing Figures

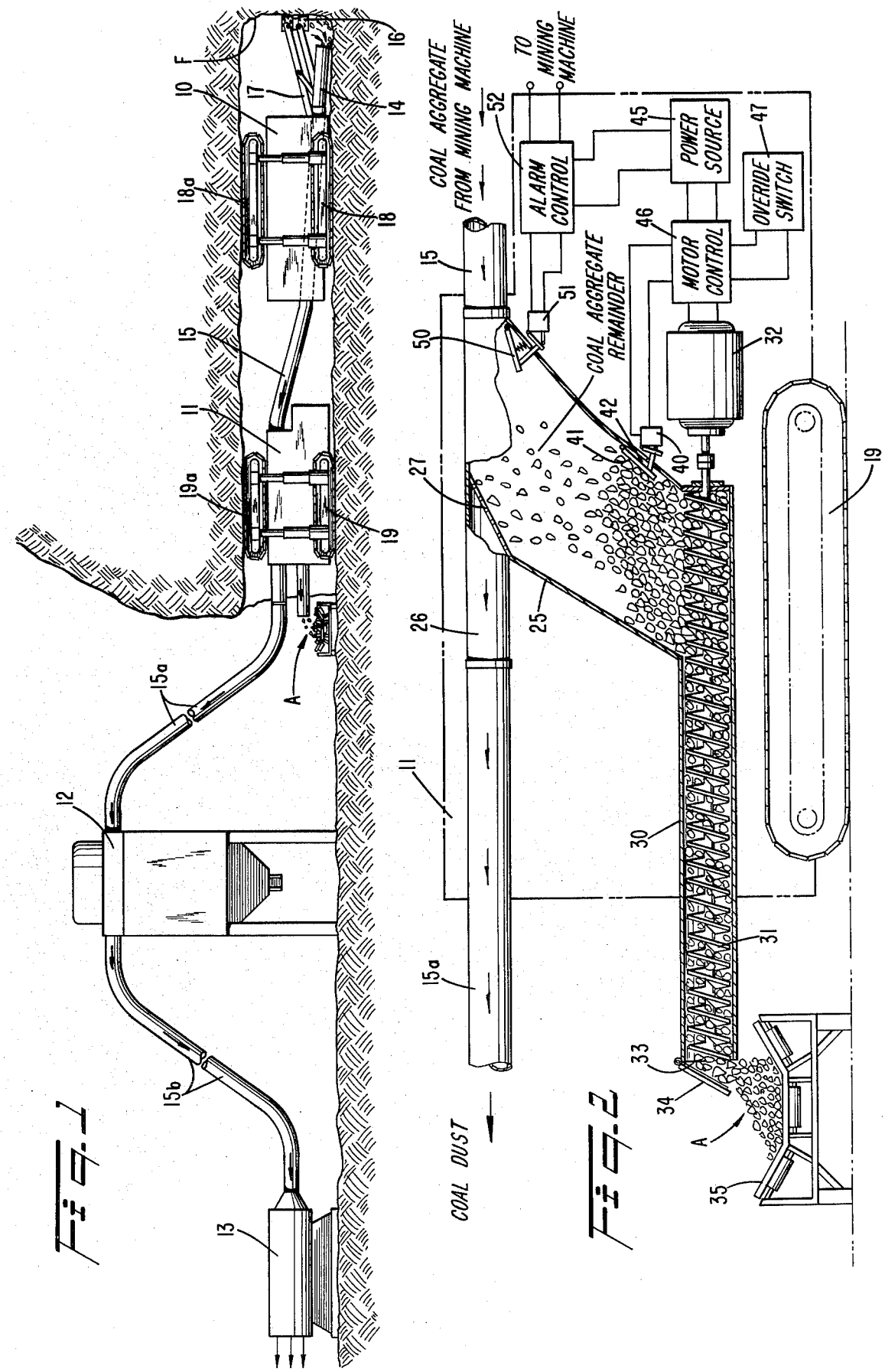

PNEUMATIC SEPARATING SYSTEM FOR CONTINUOUS MINING MACHINE

TECHNICAL FIELD

The present invention relates to coal mining systems, and more particularly to a system utilizing a pneumatic conveying system for the coal aggregate including a pneumatic separator.

Background Art

The problem of conveying coal mined by a continuous mining machine at the mine face has always provided the most significant limitation to the amount of coal that can be mined. Various systems, such as coal cars on rails, and more recently continuous conveyor systems have been used. Also there has been proposed a pneumatic conveying system for taking the coal aggregate adjacent the mining face and moving the coal through a duct to the outside of the mine. However, this pneumatic system has failed to achieve its expected use, mainly due to the lack of an efficient separator machine in the pneumatic system. Heretofore, there has not been available a simple separator machine that allows the high velocity air and the coal dust in the duct to be separated from the remainder of the coal aggregate, which is the end product of the mining operation.

In the past, the pneumatic conveyor systems have attempted to convey the entire coal aggregate out of the mine by pneumatic means. This has lead to the requirement of having a substantial number of booster turbines along the mine shaft to assure that the coal can make it to the mine entrance. One such system is shown in the Sheets U.S. Pat. No. 3,743,356, issued July 3, 1973. A similar type system wherein the entire coal aggregate is conveyed by pneumatics is shown in the Wilcox U.S. Pat. No. 3,857,490, issued Dec. 31, 1974. In this latter patent, the coal dust and the remainder of the coal aggregate is separated and conveyed along separate pneumatic streams. These prior systems consume an unusually large amount of energy, are very costly and provide an intolerable noise level within the mine.

Thus, it is one object of the present invention to provide a mining system utilizing pneumatic conveying means, that is simple in design, low cost and substantially free of noise pollution inside the mine.

It is another object of the present invention to provide a mining system utilizing a separator wherein the coal dust and the pneumatic conveying stream are separated from the remainder of the coal aggregate to be conveyed out of the mine on conventional low cost, low energy consuming conveyors.

It is still another object of the present invention to provide a pneumatic separator including an air lock to prevent backflow of air and assure maintenance of full vacuum along the pneumatic conveyor duct.

DISCLOSURE OF INVENTION

In the mining system of the present invention, a continuous mining machine is provided adjacent the operational mine face. As the coal is ripped from the mine face, it falls to the floor of the mine and is picked up by a pneumatic conveyor system. After leaving the intake funnel, the coal aggregate passes through a duct into a pneumatic separator. In the separator, the coal dust plus the high velocity air stream is separated from the remainder of the coal aggregate, which is the clean end product of the mining operation. This aggregate remainder is then conveyed to the mouth of the mine and into conventional bulk handling equipment for shipment to the ultimate consumer. The coal dust is separated in pollution control equipment at a remote location outside the mine. A turbine driven by a jet engine provides the suction for the pneumatic conveying system.

The separator machine is characterized by an air lock to prevent entry of outside air. The air lock includes an auger conveyor to feed the coal aggregate remainder onto the conventional endless conveyor system. Above the inlet to the auger conveyor is provided a hopper into which the aggregate remainder drops by gravity from the pneumatic duct mounted above. A blocking concentration of the aggregate remainder builds up in the auger conveyor and the hopper so that ambient air cannot enter the system.

A level control switch operated by a pivotal spade controls the motor for the auger conveyor. As long as the aggregate remainder covers the inlet to the auger conveyor and is piled to the predetermined level, the auger conveyor motor will operate to discharge the coal onto the endless conveyor. A similar maximum lever control switch is provided to indicate when the hopper is full, so that the operator of the mining machine can be alerted.

These and other objects, features and advantages of the present invention are presented in the following detailed description of the preferred embodiment and illustrated in the accompnaying drawing figures.

BRIEF DESCRIPTION OF DRAWINGS

FIG. 1 shows an overall view of the coal mining system of the present invention; and FIG. 2 is an enlarged view, partially in cross-section showing the separator machine of the coal mining system.

BEST MODE FOR CARRYING OUT THE INVENTION

The composite coal mining system of the present invention comprises a plurality of separate elements including a mining machine 10 operating at the mine face F, a separator machine 11, a pollution control means, such as a cyclone separator 12 and a turbine powered by a jet engine, identified by reference numeral 13. The pneumatic conveying system includes an intake funnel 14 and a continuous duct 15 connecting the described elements of the system.

The mining machine 10 can be a typical type including rotating ripper heads 16 mounted on movable support arms 17. Dual tracks 18, 18a are provided to move the machine 10 along the mine shaft and to temporarily support the mine roof in the area of the face F. Similar type of tracks 19, 19a may be provided on the separator machine 11, that is preferably close behind the mining machine 10.

In operation, the coal dislodged from the mine face F falls to the floor of the mine in front of the mining machine 10, where it is sucked into the intake funnel 14 and enters the pneumatic coneying duct 15. The coal aggregate is conveyed to the separator machine where the coal dust and the high velocity air stream continues through to the second leg 15a between the separator machine and the cyclone separator 12. The remainder of the coal aggregate, that is the aggregate that represents the useful, final product of the mining operation is represented generally by aggregate A as it exits the separator machine (see both FIGS. 1 and 2). With the coal dust being separated at the cyclone separator 12 the clean air continues through the third leg of the duct 15b and through the turbine 13 and exhausted into the atmosphere.

It will now be recognized that the system of the present invention is highly desirable in that the mined coal including highly explosive coal dust and gas is removed immediately adjacent the mine face F, pneumatically conveyed through separators and then the air stream and the gas harmlessly ejected into the atmosphere. Of course, in instances where high concentrations of gas require it, an additional gas separator may be provided along the third leg of duct at 15b before injection of the air into the atmosphere. At the separator machine 11, air is prevented from entering the duct 15 so that the full suction generated by the turbine 13 is available to convey the coal aggregate. Since the separator machine 11 may be closely positioned behind the mining machine 10, the greater bulk of the coal aggregate needs to be moved by pneumatic means only a short distance, and this assures that minimum power is required for the turbine 13. The manner in which the separator machine of the present invention is constructed and operates, can now be seen by a detailed review of FIG. 2.

The duct 15 inside the separator machine 11 branches into a downwardly depending hopper 25 and an extension 26 of the duct 15 that is connected to the second leg of the duct 15a. As the coal aggregate from the mining machine comes into communication with the hopper 25, the dust particles and the high velocity air stream continues in a straight path, as shown in FIG. 2. The coal chunks, that is the aggregate remainder, is separated by gravity and falls into the hopper 25. A suitable screen 27, positioned at an angle to the flow in the duct 15 may be employed to help deflect the aggregate remainder into the hopper 25. The screen 27 may be any one of well-known screens and may include if desired mechanical cleaning means (not shown) to insure continuous operation of the system.

At the bottom of the hopper 25 is a first conveyor 30, which preferably includes an auger 31 mounted in a tube. A motor 32 drives the auger 31 to move the aggregate remainder from adjacent the inlet of the conveyor at the bottom of the hopper 25 to an exit orifice 33 that may be provided with a gravity operated door 34. The aggregate remainder A falls onto a second conveyor 35 that is open to ambient conditions. As shown in FIG. 2, the conveyor may be an endless conveyor and takes the aggregate remainder A out of the mine shaft and to conventional bulk handling equipment (not shown) for transport to the ultimate consumer.

In order to prevent the entry of air through the exit orifice 33, the hopper 25 and the auger conveyor 30 are provided with novel air lock means. The air lock is provided by suitable blocking concentration of the coal aggregate remainder along the conveyor 30 and/or the hopper 25. To assure this concentration, a level control switch 40 is provided on the hopper in a position to make certain that a sufficient level of aggegate remainder fills the inlet to the auger conveyor 30, thus preventing the passage of air back up through the hopper 25 and into the duct 15a via the duct extension 26. As long as this level is maintained, this air blocking relationship is effective and efficient operaton of the mining system is assured.

The operation of the switch 40 is controlled by a pivoted spade 41 that is sring-biased by spring 42 toward the inside of the hopper 25. When the coal is piled sufficiently high to rest on top of the spade 41, the spring is depressed and the switch 40 is operated. The switch controls power from power source 45 by a suitable motor control 46. An override switch 47 may be provided to manually operate the motor 32 and the conveyor auger 31.

In order to make certain that the hopper 25 does not overfill, thus cutting off the flow through the duct 15, an additional pivotal spade 50 adjacent the top of the hopper 25 operates a switch 51 connected to conventional alarm control 52 and connected to a suitable alarm in the mining machine 10. Thus, in the event that the coal being mined by the machine 10 temporarily exceeds the capacity of the separator machine 11, an alarm will sound and the operator can momentarily discontinue the mining operation. Also, in the event that a malfunction occurs in the separator 11, the operator is alerted in order to take corrective action.

In operation, the coal aggregate moves through the duct 15 to the separator 11 by means of the high velocity air flow generated by the suction from the turbine 13. The dust and high velocity air exit through the duct extension 26 and continue along the second leg of the duct 15a leaving behind the coal aggregate remainder that falls into the bottom of the hopper 25 (FIG. 2). With the spade 41 depressed by buildup of the aggregate, the motor control 46 is activated by the switch 40 turning on the motor 32 to begin the discharge of the coal. In the event that the level of the pile of coal in the hopper 25 goes below the level of the spade 41, the spade is urged outwardly by the spring 42 opening the switch 40 and turning off the motor 32. The concentration of coal in the hopper 25, and along the conveyor 30, prevents air from flowing back through the orifice 32 and into the system.

At the end of an operating shift, or to clear the separator machine 11 for maintenance or the like, the override switch 47 can be manually operated. In this instance, all of the coal will be conveyed out of the separator machine 11. Advantageously when the system is placed back in operation, the separator machine 11 is self-priming since the door 34 will close to seal the orifice 33 and prevent entry of air. Once the coal in the conveyor 30 reaches the orifice 33, the door is pushed open and the aggregate remainder A is dumped on the second conveyor 35.

In summary, an efficient, and especially simple mining system with a separator for the coal is provided. The high velocity air in the pneumatic conveyor duct 15 and the coal dust is pulled out of the mine by the turbine 13; whereas, the coal aggregate remainder comes out of the separator machine 11 and may be conveyed out of the mine on existing endless conveyors making up a conveyor line to the bulk handling equipment outside the mine. The coal aggregate (except for the dust) is moved only along a short span of the pneumatic duct 15, thereby assuring minimum energy required in the turbine 13 and providing for systems that can enter deeper into a mine than heretofore available with pneumatic conveyors. An air lock is provided in the first conveyor 30 and the hopper 25 assuring against backflow of air that would kill the vacuum in the pneumatic system. The separator machine 11 is automatically operated by suitable level control switches making the need for constant monitoring by an operator unnecessary.

The present invention is not limited to the specific details shown and described, and modifications may be made without departing from the scope of the invention.

I claim:

1. A coal mining system comprising
a mining machine to dislodge coal from the working mine face to form coal aggregate;
pneumatic means to convey the dislodged coal aggregate including dry coal dust from the mine face;
said pneumatic means including duct means for transferring said dry coal dust from the mine face to a remote location and the remainder of said aggregate to an intermediate location; and
separator means at said intermediate location to separate said coal aggregate into said dust and aggregate remainder;
said separator means including air lock means to prevent backflow of air and assure maintenance of full vacuum along said duct means;
said air lock means including a first conveyor, a hopper above the inlet of said first conveyor and control means to maintain a blocking concentration of said coal aggregate remainder in the hopper to prevent the backflow of air through first conveyor in said separator means.

2. The coal mining system of claim 1 wherein is further provided a second conveyor open to ambient conditions for receiving said aggregate remainder at said intermediate location to convey the same out of said mine.

3. A coal mining system comprising
a mining machine to dislodge coal from the working mine face to form coal aggregate;
pneumatic means to convey the dislodged coal aggregate including dry coal dust from the mine face;
said pneumatic means including duct means for transferring said dry coal dust from the mine face to a remote location and the remainder of said aggregate to an intermediate location; and
separator means at said intermediate location to separate said coal aggregate into said dust and aggregate remainder;
said separator means including air lock means to prevent backflow of air and assure maintenance of full vacuum along said duct means;
said air lock means including a first conveyor, a hopper above the inlet of said first conveyor and control means to maintain a blocking concentration of said coal aggregate remainder in the hopper to prevent the backflow of air through first conveyor in said separator means;
said control means including switch means on said separator means to detect a sufficient concentration of aggregate remainder in said conveyor and said hopper to block the flow of air and a motor responsive to said switch means for driving said first conveyor only when said blocking concentration is maintained.

4. The coal mining system of claim 3 wherein said first conveyor comprises an auger, whereby the flow of air may be blocked by the aggregate remainder concentration in said auger.

5. The coal mining system of claim 3 wherein said switch means comprises a level control switch in said hopper, whereby said motor is operated only when a predetermined level of aggregate remainder is maintained in said hopper.

6. The coal mining system of claim 5 wherein is further provided a pivotal spade extending downwardly in said hopper to operate said switch.

7. The coal mining system of claim 5 wherein is further provided alarm means to alert the operator of said mining machine when said hopper is full.

8. A coal mining system comprising
a mining machine to dislodge coal from the working mine face to form coal aggregate;
pneumatic means to convey the dislodged coal aggregate including dry coal dust from the mine face;
said pneumatic means including duct means for transferring said dry coal dust from the mine face to a remote location and the remainder of said aggregate to an intermediate location;
separator means at said intermediate location to separate said coal aggregate into said dust and aggregate remainder;
said separator means including air lock means to prevent backflow of air and assure maintenance of full vacuum along said duct means; and
pollution control means at said remote location outside said mine to recover said dry dust.

9. The coal mining system of claim 8 wherein said pneumatic means includes a turbine driven by a jet engine downstream of said pollution control means.

* * * * *